United States Patent
Ohtsuka

(10) Patent No.: US 10,445,033 B2
(45) Date of Patent: Oct. 15, 2019

(54) MAINTENANCE MANAGEMENT DEVICE, DEVICE TO BE MAINTAINED AND NON-TRANSITORY RECORDING MEDIUM STORING A COMPUTER READABLE PROGRAM

(71) Applicant: Konica Minolta, Inc., Tokyo (JP)

(72) Inventor: Masaru Ohtsuka, Tachikawa (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 15/928,720

(22) Filed: Mar. 22, 2018

(65) Prior Publication Data

US 2018/0275929 A1 Sep. 27, 2018

(30) Foreign Application Priority Data

Mar. 27, 2017 (JP) .................................. 2017-061827

(51) Int. Cl.
G06F 3/12 (2006.01)
H04N 1/00 (2006.01)

(52) U.S. Cl.
CPC ............ *G06F 3/1229* (2013.01); *G06F 3/121* (2013.01); *G06F 3/1211* (2013.01); *G06F 3/1285* (2013.01); *G06F 3/1293* (2013.01); *H04N 1/00344* (2013.01); *H04N 2201/0094* (2013.01)

(58) Field of Classification Search
CPC .............................. G06F 3/1211; G06F 3/1229
See application file for complete search history.

(56) References Cited

U.S. PATENT DOCUMENTS

| | | | |
|---|---|---|---|
| 6,772,236 B1* | 8/2004 | Williams | G06F 1/266 710/15 |
| 2002/0178110 A1* | 11/2002 | Yoshiura | G06Q 30/08 705/37 |
| 2008/0310864 A1* | 12/2008 | Katoh | G03G 15/5079 399/26 |
| 2018/0115903 A1* | 4/2018 | Badic | H04W 16/14 |

FOREIGN PATENT DOCUMENTS

| | | |
|---|---|---|
| JP | H7-203108 A | 3/1992 |
| JP | H4-076561 A | 8/1995 |
| WO | 2016182634 A1 | 11/2016 |

OTHER PUBLICATIONS

CNIPA, Office Action for the corresponding Chinese Patent Application No. 201810232125.5, dated Jul. 1, 2019, with English translation (20 pages).

* cited by examiner

*Primary Examiner* — Ibrahim Siddo
(74) *Attorney, Agent, or Firm* — Lucas & Mercanti, LLP

(57) ABSTRACT

Disclosed is a maintenance management device, including: a communicator that communicates with a device to be maintained; and a hardware processor that: regularly receives a regular report indicating deterioration/exhaustion information for a plurality of replacement parts, from the device to be maintained; specifies the replacement part for which the deterioration/exhaustion information is required before a next regular report is received and a timing of obtaining the deterioration/exhaustion information for the specified replacement part, in accordance with the received regular report; and requests a temporary report indicating the deterioration/exhaustion information for the specified replacement part, to the device to be maintained at the specified timing, and obtaining the temporary report.

12 Claims, 13 Drawing Sheets

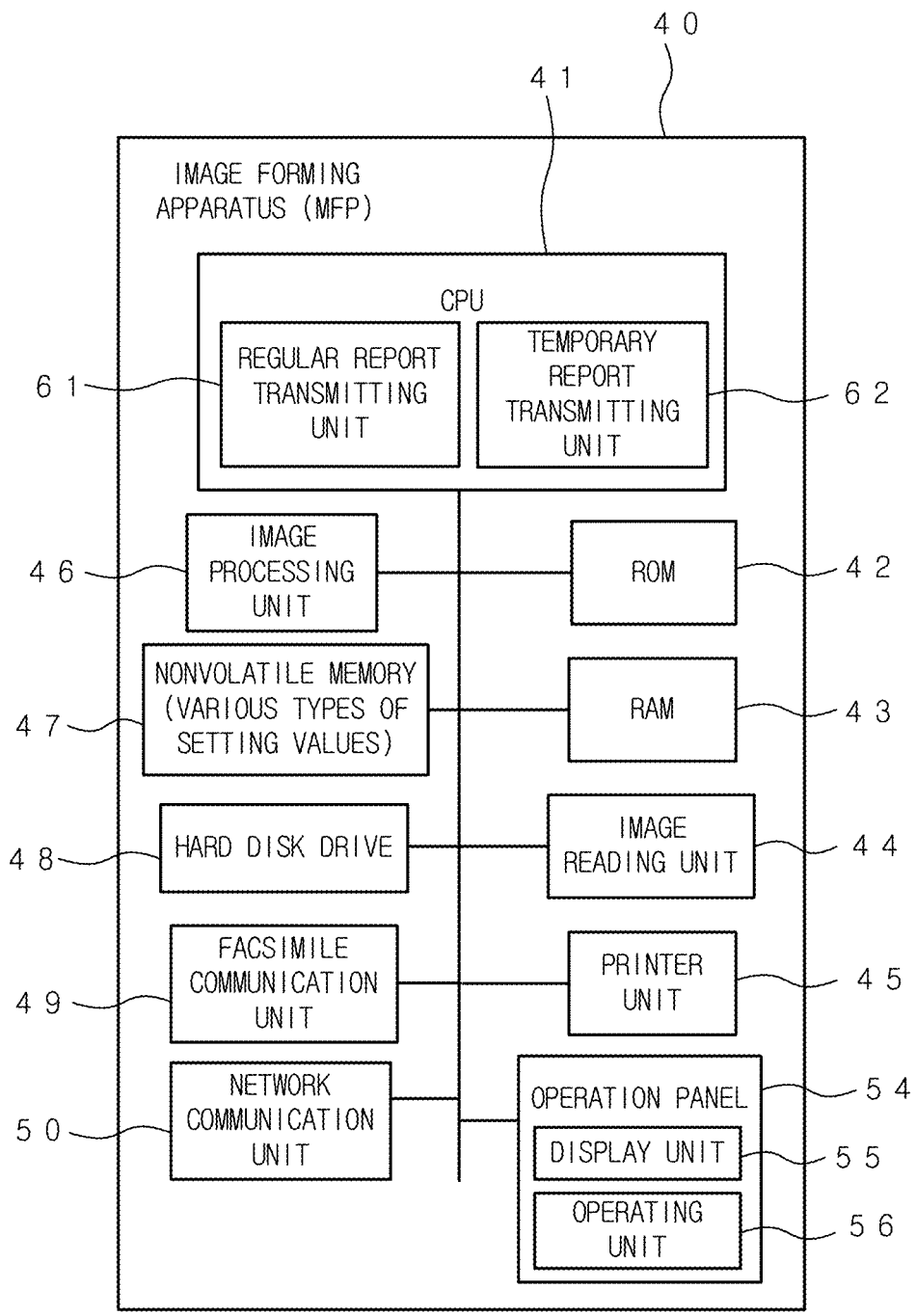

FIG.4

REGULAR REPORT

| LIFETIME SETTING VALUE OF EACH REPLACEMENT PART |
| --- |
| FIXING ROLLER |
| FIXING LUMP |
| ... |
| ... |

| INFORMATION RELATING TO USAGE RATIO OF EACH REPLACEMENT PART |
| --- |
| FIXING ROLLER |
| FIXING LUMP |
| ... |
| ... |

| INFORMATION RELATING TO USAGE CONDITION |
| --- |
| THICKNESS OF EACH PAPER SHEET |
| THE NUMBER OF PRINTED SHEETS USED FOR ONE JOB |
| TEMPERATURE AND HUMIDITY |
| ... |
| ... |

| OTHERS |
| --- |

TEMPORARY REPORT

| INFORMATION RELATING TO USAGE RATIO OF EACH REPLACEMENT PART |
| --- |
| FIXING ROLLER |

| INFORMATION RELATING TO USAGE CONDITION |
| --- |
| THICKNESS OF EACH PAPER SHEET |

FIG.5

| THICKNESS OF PAPER SHEET | COEFFICIENT |
|---|---|
| THICKNESS 1 | 0.9 |
| THICKNESS 2 | 1.0 |
| THICKNESS 3 | 1.1 |
| THICKNESS 4 | 1.2 |
| THICKNESS 5 | 1.3 |
| THICKNESS 6 | 1.4 |
| THICKNESS 7 | 1.5 |
| THICKNESS 8 | 1.6 |
| THICKNESS 9 | 1.7 |
| THICKNESS 10 | 1.8 |
| THICKNESS 11 | 1.9 |

FIG.7

| THE NUMBER OF PRINTED SHEETS | COEFFICIENT |
|---|---|
| 1 SHEET | 3.0 |
| 2 OR MORE SHEETS | 1.0 |

WHEN REPLACEMENT REQUEST IS RECEIVED BEFORE TIMING B1, REQUEST OF TEMPORARY REPORT IS NOT TRANSMITTED AT TIMING B1.

MAINTENANCE MANAGEMENT DEVICE, DEVICE TO BE MAINTAINED AND NON-TRANSITORY RECORDING MEDIUM STORING A COMPUTER READABLE PROGRAM

The entire disclosure of Japanese Patent Application No. 2017-61827 filed on Mar. 27, 2017, is incorporated herein by reference in its entirety.

BACKGROUND

Technological Field

The present invention relates to a maintenance management device and the like, for managing the replacement timing of the replacement part in the device to be maintained.

Description of the Related Art

In a device installed in an office or the like, such as a multi function peripheral having a copy function, a scan function, a print function and the like, in case that the part of the device is replaced after the lifetime of the part is ended and the part is ordered, it is inconvenient for a user to be unable to use the device for a long time. Therefore, the regular report indicating the usage amount and the like of each replacement part is regularly transmitted to a maintenance management device of the maintenance company via a network, and the replacement timing of each part is estimated by the maintenance management device. Before the lifetime of the part is ended, a new part is sent or the part is replaced with a new part by a serviceperson.

However, because the replacement timing of each part cannot be accurately estimated only by the regular report, the replacement of each part cannot be managed, for example, in case that the usage amount of the part is drastically changed. As a result, there is some possibility that the lifetime of the part is ended before the next regular report.

As the technology for suitably estimating the replacement timing of each part, in Japanese Patent Application Publication No. H7-203108, the technology for changing the interval of the regular reports according to the usage amount of the part is disclosed.

In the regular report, the information relating to each usage amount and each usage condition of all of the replacement parts is transmitted to the maintenance management device. The data size of this information is very large. In the technology disclosed in Japanese Patent Application Publication No. H7-203108, when the usage amount of the device is increased, the interval of the regular reports is shortened. Therefore, the data having the large data size is transmitted in each regular report. As a result, the communication cost and the communication load in the maintenance management device become large.

SUMMARY

One of the objects of the present invention is to provide a maintenance management device, a device to be maintained and a non-transitory recording medium storing a computer readable program which can suppress the increase in the communication load and suitably manage the replacement timing of each part.

To achieve at least one of the abovementioned objects, according to an aspect of the present invention, a maintenance management device reflecting one aspect of the present invention, comprises:

a communicator that communicates with a device to be maintained; and a hardware processor that:

regularly receives a regular report indicating deterioration/exhaustion information for a plurality of replacement parts, from the device to be maintained;

specifies the replacement part for which the deterioration/exhaustion information is required before a next regular report is received and a timing of obtaining the deterioration/exhaustion information for the specified replacement part, in accordance with the received regular report; and requests a temporary report indicating the deterioration/exhaustion information for the specified replacement part, to the device to be maintained at the specified timing, and obtaining the temporary report.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 3 is a block diagram showing the schematic configuration of the image forming apparatus;

FIG. 4 is a view showing an example of the contents of the regular report to be transmitted to the management server by the image forming apparatus, and an example of the contents of the temporary report to be transmitted to the management server;

FIG. 5 is a view showing the thickness of each paper sheet and each coefficient for normalizing the usage amount caused by using each paper sheet, to the usage amount to be caused in case that the paper sheet having the predetermined standard thickness is used;

FIG. 7 is a view showing each coefficient for converting the number of the printed paper sheets to the normalized number of the printed paper sheets;

DETAILED DESCRIPTION OF THE EMBODIMENT

Hereinafter, one or more embodiments of the present invention will be described with reference to the drawings. However, the scope of the invention is not limited to the disclosed embodiments.

Figure 1:
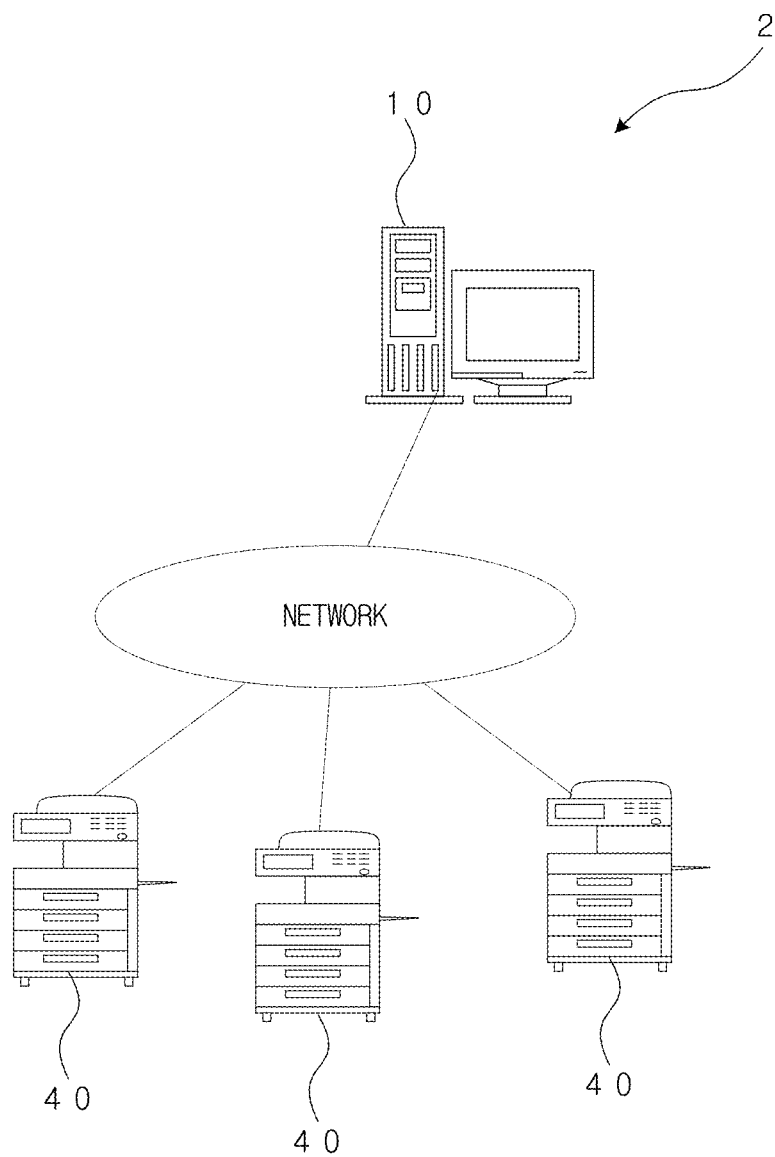
FIG. 1 is a view showing an example of the schematic configuration of the maintenance management system according to the embodiment.

FIG. 1 shows an example of the schematic configuration of the maintenance management system 2 according to the embodiment. In the maintenance management system 2, a management server 10 which is the maintenance management device is connected with a plurality of image forming apparatuses 40 via a network, such as the Internet. The management server 10 is installed in a maintenance company for maintaining and managing the image forming apparatuses 40, or the like, and each image forming apparatus 40 is installed in an office or the like of each user.

The image forming apparatus 40 is a so-called multi function peripheral which has a copy function for printing an image of an original on a recording sheet by optically reading the original, a scan function for storing the image data obtained by optically reading an original as a file and transmitting the image data to an external terminal via the network, a print function for printing an image in accordance with the print data received from a user's information processing terminal, and the like.

The management server 10 monitors the abnormality of each image forming apparatus 40 to be maintained by being connected via the network, and manages the replacement timing of each replacement part in each image forming apparatus 40.

Each image forming apparatus 40 transmits the regular report indicating the deterioration/exhaustion information for a plurality of (for example, all) replacement parts to the management server 10 at the predetermined intervals (for example, the intervals of one week). The deterioration/exhaustion information is the information indicating the degree of the deterioration and the exhaustion of each replacement part, or the information for calculating the degree of the deterioration and the exhaustion of each replacement part.

Because the replacement timing of each part cannot be accurately estimated only by the regular report, in the maintenance management system 2 according to the embodiment, the temporary report is used in addition to the regular report.

The management server 10 calculates the usage amount to the lifetime of each replacement part in accordance with the regular report received from each image forming apparatus 10. Before the next regular report, the management server 10 specifies the replacement part for which the deterioration/exhaustion information is individually requested as the temporary report, and the timing of obtaining the deterioration/exhaustion information for the specified replacement part. When the specified timing has come, the management server 10 requests the image forming apparatus 40 having the specified replacement part to transmit the temporary report indicating the deterioration/exhaustion information for the specified replacement part.

The image forming apparatus 40 receiving the request of the temporary report, prepares the temporary report indicating the deterioration/exhaustion information for the specified replacement, and transmits the prepared temporary report to the management server 10. In the maintenance management server 2, the replacement timing of the replacement part is estimated by using the regular report and the temporary report. As described above, by using the regular report and the temporary report, it is possible to estimate the replacement timing of the part with a high accuracy. Further, it is possible to order the part at a suitable timing before the lifetime of the part is ended.

Figure 2:
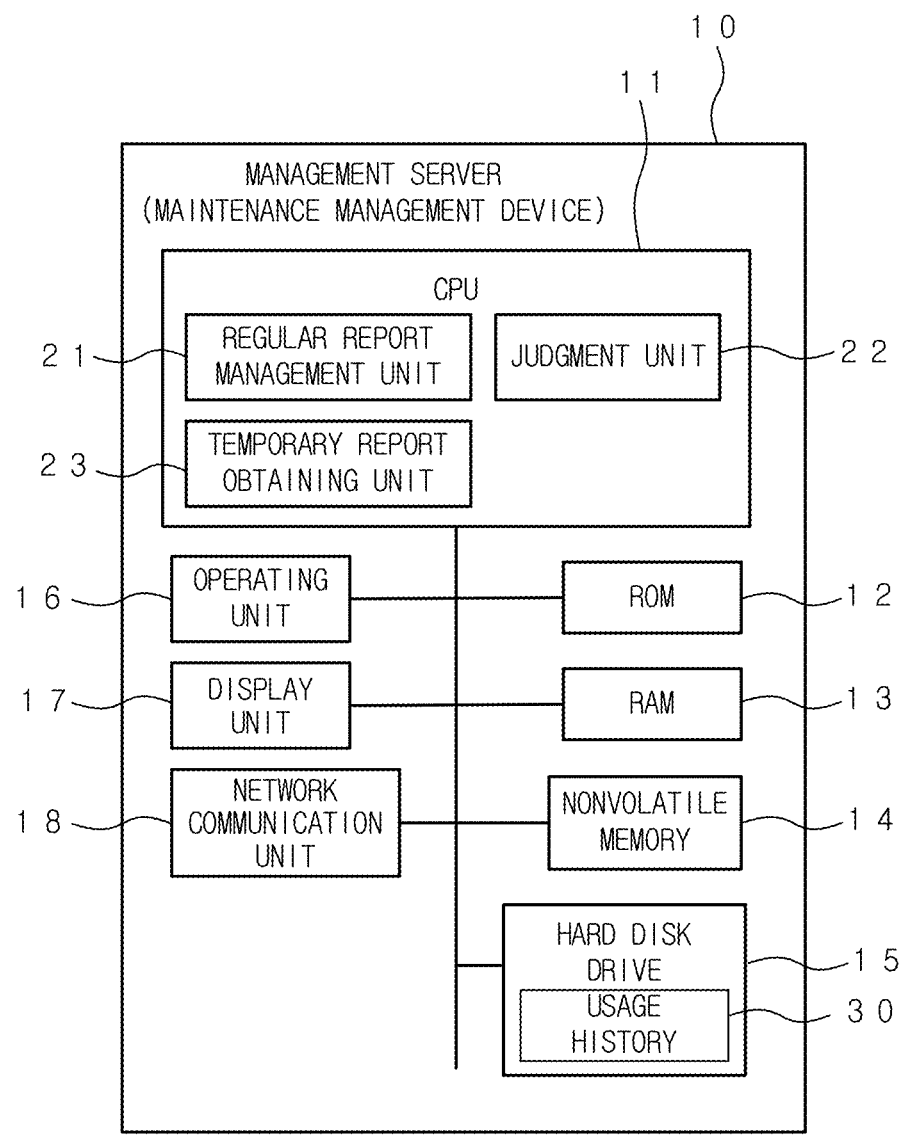
FIG. 2 is a block diagram showing the schematic configuration of the management server.

FIG. 2 is a block diagram showing the schematic configuration of the management server 10. The management server 10 comprises a CPU (Central Processing Unit) 11 for entirely controlling the operation of the management server 10. The CPU 11 is connected with a ROM (Read Only Memory) 12, a RAM (Random Access Memory) 13, a nonvolatile memory 14, a hard disk drive 15, an operating unit 16, a display unit 17, a network communication unit 18, and the like via a bus.

By the CPU 11, a middleware, application programs and the like are executed on an OS (Operating System) program as a base. In the ROM 12, various types of programs are stored. By executing various types of processes by the CPU 11 in accordance with these programs, each function of the management server 10 is realized.

The RAM 13 is used as a work memory for temporarily storing various data when the CPU 11 executes the process in accordance with the programs, and the like.

The nonvolatile memory 14 is a memory (flash memory) in which the stored contents are not damaged even if the management server 10 is turned off, and is used for storing various types of fixed data and settings.

The hard disk drive 15 is a large-capacity nonvolatile memory device. In the hard disk drive 15, various types of application programs and data are stored. Further, the usage history 30 for each replacement part of each image forming apparatus 40, which is prepared in accordance with the regular report and the temporary report received from each image forming apparatus 40, is stored.

The display unit 17 has a liquid crystal display and the like, and has the function for displaying various types of operation windows, setting windows and the like. The operating unit 16 comprises some hardware keys and a touch panel provided on the physical display surface of the display unit 17.

The network communication unit 18 has the function for communicating with each image forming apparatus 40 and the other external devices via the network.

The CPU 11 of the management server 10 has the function of the regular report management unit 21, the judgment unit 22, the temporary report obtaining unit 23 and the like by executing the programs.

The regular report management unit 21 has the function as the regular report receiving unit for regularly receiving the regular report indicating the deterioration/exhaustion information for a plurality of replacement parts, from each image forming apparatus 40 to be maintained, by using the network communication unit 18. Further, the regular report management unit 21 registers the deterioration/exhaustion information included in the received regular report in the usage history 30 to reflect the received deterioration/exhaustion information.

The judgment unit 22 specifies the replacement part for which the deterioration/exhaustion information is individually requested before the next regular report is received and the timing of obtaining the deterioration/exhaustion information for the specified replacement part, in accordance with the regular report received by the regular report management unit 21 and the temporary report. The temporary report obtaining unit 23 has the function for requesting (transmitting the request of) the temporary report indicating the deterioration/exhaustion information for the replacement part specified by the judgment unit 22, to the image forming apparatus 40 having the specified replacement part, by using the network communication unit 18 when the timing specified by the judgment unit 22 has come.

FIG. 3 is a block diagram showing the schematic configuration of the image forming apparatus 40. The image forming apparatus 40 comprises a CPU 41 for entirely controlling the operation of the image forming apparatus 40. The CPU 41 is connected with a ROM 42, a RAM 43, an image reading unit 44, a printer unit 45, an image processing unit 46, a nonvolatile memory 47, a hard disk drive 48, a facsimile communication unit 49, a network communication unit 50, an operation panel 54, and the like.

By the CPU 41, a middleware, application programs and the like are executed on an OS program as a base. In the ROM 42, various types of programs are stored. By executing various types of processes by the CPU 41 in accordance with these programs, each function of the image forming apparatus 40 is realized.

The RAM 43 is used as a work memory for temporarily storing various data when the CPU 41 executes the process in accordance with the programs, an image memory for storing an image data, and the like.

The image reading unit 44 has the function for obtaining image data by optically reading an image of an original. For example, the image reading unit 44 comprises a light source for irradiating an original disposed on the platen glass with light, a line image sensor for reading the original line by line in the width direction of the original by receiving the reflected light from the original, a moving unit for moving the position in which the light source irradiates the original with the light and for sequentially moving the reading position of the line image sensor line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The printer unit 45 has the function for forming an image on the recording sheet in accordance with the image data. In this embodiment, the printer unit 45 is configured as a so-called laser printer which comprises a conveying device for the recording sheet, a photoconductive drum, a charging device, a laser unit, a developing device, a transfer and separation device, a cleaning device and the fixing device, and which forms an image by the electrophotographic process. Alternatively, an image may be formed by another type of printer. The fixing device fixes the toner image on the paper sheet by heating and pressurizing the toner image on the paper sheet. The fixing device comprises a pair of fixing rollers which are pressed with each other, fixing lumps which are inserted into the fixing rollers and heat the fix rollers, and the like. A pair of fixing rollers and the fixing lumps are the replacement parts to be maintained.

The image processing unit 46 carries out the rasterizing process for converting print data included in the print job into image data, the compression/decompression process for the image data, and the like in addition to the processings, such as the enlargement/reduction or the rotation of image data.

The nonvolatile memory 47 is a memory (flash memory) in which the stored contents are not damaged even if the image forming apparatus 40 is turned off, and is used for storing setting values relating to various setting items.

The hard disk drive 48 is a large-capacity nonvolatile memory device. In the hard disk drive 48, various types of application programs, the received print jobs and the like are stored.

The facsimile communication unit 49 has the function for transmitting and receiving the image data to/from an external device having the facsimile function via a public line.

The network communication unit 50 has the function for communicating with the management server 10, the administrator's information processing terminal, other external devices and the like via the network.

The operation panel 54 comprises a display unit 55 and an operating unit 56. The display unit 55 comprises a liquid crystal display (LCD) and the like, and has the function for displaying various types of operation windows, setting windows and the like. The operating unit 56 comprises various types of hardware keys, such as a numeric keypad, a start button and the like, and a touch panel provided on the physical display surface of the display unit 55. The touch panel detects the coordinate position on which a user touches the physical display surface of the display unit 55 to operate the image forming apparatus 40 by using a touch pen, a user's finger or the like.

The CPU 41 of the image forming apparatus 40 has the function as the regular report transmitting unit 61, the temporary report transmitting unit 62 and the like, by executing the programs.

The regular report transmitting unit 61 has the function for regularly preparing the regular report indicating the deterioration/exhaustion information for each replacement part in the image forming apparatus 40 and for regularly transmitting the prepared regular report to the management server 10 by using the network communication unit 50. The temporary report transmitting unit 62 has the function for preparing the temporary report indicating the deterioration/exhaustion information for the replacement part specified by the judgment unit 22 when the request of the temporary report is received from the management server 10, and the function for transmitting the prepared temporary report to the management server 10 by using the network communication unit 50.

In addition, the CPU 41 of the image forming apparatus 40 has the function for managing the usage amount and the usage condition of each replacement part (counting the number of used paper sheet, measuring the operating time of the image forming apparatus 40, and the like), and has the function for storing the history of the usage amount and the usage condition.

FIG. 4 shows an example of the contents of the regular report to be transmitted to the management server 10 by the image forming apparatus 40, and an example of the contents of the temporary report to be transmitted to the management server 10. In this embodiment, the deterioration/exhaustion information is the information indicating the usage amount and the usage condition of each replacement part. The usage amount indicates the usage amount which is counted after the previous regular report or the previous temporary report.

The regular report includes the information for all of the replacement parts, such as the lifetime setting value, the usage amount, the usage condition and the like, and the other predetermined information. The lifetime setting value and the usage amount are indicated by the attribute value according to each replacement part, such as the number of paper sheets, the time, the distance, and the like. The usage condition is the information relating to the thickness of the paper sheet to be used, the information relating to the number of the paper sheets to be used in one job, and the like. The usage condition is used for normalizing the usage amount.

The temporary report includes the information relating to the usage amount and the usage condition of only the replacement part for which the deterioration/exhaustion information is reported in the temporary report (only the replacement part to be reported in the temporary report). The example of FIG. 4 indicates the case in which the replacement part to be reported in the temporary report is the fixing roller.

The usage amount of the fixing roller is indicated by the number of the printed paper sheets. Alternatively, the usage amount of the fixing roller may be indicated by the number of the rotations of the fixing roller or the distance at which the reference point of the periphery of the fixing roller is moved by the rotation of the fixing roller. The usage condition is the information relating to the thickness of the paper sheet to be used. The usage condition is indicated by the number of the printed paper sheets counted for each thickness, for example, A (0 or a natural number) papers sheets having the thickness 1, B (0 or a natural number) paper sheets having the thickness 2, and the like.

FIG. 5 shows the thickness of each paper sheet and each coefficient for normalizing the usage amount of the fixing roller, which is caused by using each paper sheet, to the usage amount to be caused in case that the paper sheet having the predetermined standard thickness is used. The deterioration degree (the increase ratio of the usage ratio) of the fixing roller, which is caused when the predetermined number of the paper sheets are used for printing the images, is varied according to the thickness of the paper sheet (usage condition). Therefore, the management server 10 calculates the increase in the usage ratio of the fixing roller by normalizing the usage amount based on the usage amount (the number of the used paper sheets) and the usage condition (the thickness of the paper sheet) obtained in the regular report and the like.

In the example of FIG. 5, the thickness 2 is set to the reference thickness. Further, each coefficient for normalizing the usage amount by converting the usage amount which is caused when the paper sheets having various thicknesses are used, into the usage amount which is caused when the paper sheets having the thickness 2 are used, is shown. The whole usage amount normalized by converting the usage amount which is caused when the paper sheets having various thicknesses are used, is calculated by the following equation: the usage amount which is caused when the paper sheets having the thickness 1 are used (the number of paper sheets having the thickness 1)×0.9+the usage amount which is caused when the paper sheets having the thickness 2 are used (the number of paper sheets having the thickness 2)×1.0+the usage amount which is caused when the paper sheets having the thickness 3 are used (the number of paper sheets having the thickness 3)×1.1+the usage amount which is caused when the paper sheets having the thickness 4 are used (the number of paper sheets having the thickness 4)×1.2+ . . . +the usage amount which is caused when the paper sheets having the thickness 10 are used (the number of paper sheets having the thickness 10)×1.8+the usage amount which is caused when the paper sheets having the thickness 11 are used (the number of paper sheets having the thickness 11)×1.9. In other words, whole normalized usage amount (the number of paper sheets)=(the number of paper sheets having thickness 1)×0.9+(the number of paper sheets having thickness 2)×1.0+(the number of paper sheets having thickness 3)×1.1+ . . . +(the number of paper sheets having thickness 11)×1.9

The calculation of the normalized usage amount may be carried out by the management server 10. Alternatively, the calculation of the normalized usage amount may be carried out by the image forming apparatus 40 and the normalized usage amount may be transmitted from the image forming apparatus 40 to the management server 10. In this case, the image forming apparatus 40 may transmit the normalized usage amount without transmitting the usage amount and the usage condition as the deterioration/exhaustion information in the regular report and the temporary report.

Next, the operation for requesting the temporary report relating to the fixing roller, will be explained. The management server 10 calculates the increase in the normalized usage amount of the fixing roller (the increase which is caused after the previous report is received) in accordance with the usage amount (the number of the printed paper sheets) and the usage condition (the thickness of each paper sheet, and the like) every when the regular report is received. Then, the management server 10 updates the usage ratio of the fixing roller by adding the calculated increase to the current usage ratio. In case that the updated usage ratio of the fixing roller exceeds the threshold value, the management server 10 judges that the temporary report relating to the fixing roller is necessary. When it is judged that the temporary report is necessary, the management server 10 calculates the timing of transmitting the request of the necessary temporary report to image forming apparatus 40 (the timing of obtaining the temporary report). The calculation of the timing will be explained later.

When the timing has come, the management server 10 transmits the request of the temporary report to the image forming apparatus 40 having the fixing roller to be maintained. When the image forming apparatus 40 receives the request of the temporary report, the image forming apparatus 40 prepares the temporary report relating to the fixing roller and transmits the prepared temporary report to the management server 10. The management server 10 which receives the temporary report calculates the usage ratio of the fixing roller by adding the usage amount indicated in the temporary report (by converting the indicated usage amount to the increase in the usage ratio and adding the increase in the usage ratio to the current usage ratio), and updates the usage history 30 by registering the calculated usage ratio. Then, the management server 10 calculates the timing of transmitting the request of the next temporary report to the image forming apparatus 40. The above-described operations are repeated.

Figure 6:
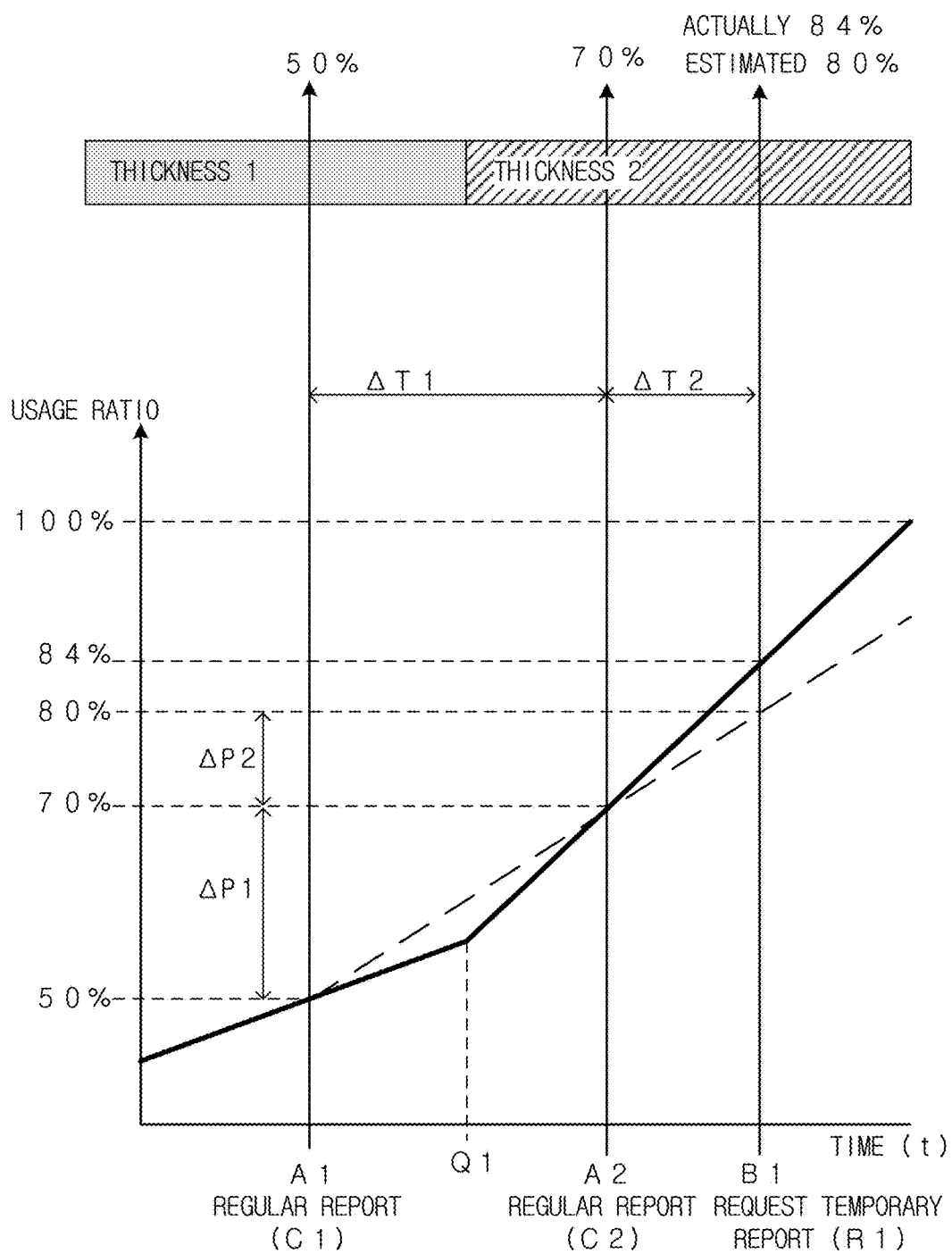
FIG. 6 is a view for explaining an example of the calculation of the timing at which the request of the temporary report is transmitted (timing of obtaining the temporary report)

FIG. 6 is a view for explaining an example of the calculation of the timing at which the request of the temporary report is transmitted (timing of obtaining the temporary report). The increase ratio of the usage ratio is estimated in accordance with the deterioration/exhaustion information obtained from a plurality of the reports, such as the regular reports and the temporary reports, and calculates the timing at which the usage ratio reaches the predetermined threshold value in case that the usage ratio is increased by the estimated increase ratio of the usage ratio.

In the example of FIG. 6, the management server 10 receives the regular report C1 from the image forming apparatus 40 at the timing A1. After the time ΔT1 passed, the management server 10 receives the next regular report C2 from the image forming apparatus 40 at the timing A2.

The usage ratio of the fixing roller at the timing of receiving the regular report C1 (the usage ratio which is calculated by accumulating the information including the regular report C1, which has been obtained since the fixing roller is replaced) is 50% of the lifetime setting value for the fixing part. The usage ratio of the fixing roller at the timing of receiving the regular report C2 is 70%. Because the usage ratio of the fixing roller reaches the predetermined threshold value (in this case, 70%) or more, the judgment unit 22 of the management server 10 specifies the fixing roller as the part to be reported in the temporary report. Then, the timing of transmitting the request of the temporary report to the image forming apparatus 40 having the specified fixing roller is calculated.

In this case, the increase ratio of the usage ratio of the fixing part ($\Delta P1/\Delta T1$) is calculated from the increase in the usage ratio of the fixing roller ($\Delta P1$), which is caused during the time period from the most recent regular report to the previous one (during the interval of the regular reports ($\Delta T1$)), and the interval of the regular reports ($\Delta T1$). From the calculated increase ratio, the timing at which the usage ratio is increased by $\Delta P2$ is calculated as the timing of transmitting the request of the temporary report (time $\Delta T2$ later from the present time). That is, $\Delta T2$ is calculated by using the following equation.

$$\Delta T2=(\Delta P2/\Delta P1)\times\times T1 \qquad \text{Equation 1}$$

For example, in the example of FIG. 6, in case that the temporary report is requested when the usage ratio reaches the threshold value (80%), $\Delta T2$ is calculated by substituting the value (threshold value (80%)–the current usage ratio (70%)) for $\Delta P2$, substituting the value (70%–50%) for $\Delta P1$ and substituting the interval of the regular reports for $\Delta T1$ in Equation 1. After the time $\Delta T2$ passed from the present time (at the timing B1), the management server 10 transmits the request of the temporary report relating to the fixing roller to the image forming apparatus 40 having the specified fixing roller.

The image forming apparatus 40 which receives the request of the temporary report, prepares the information relating to the usage amount and the usage condition of the replacement part (in this example, the fixing roller) specified in the request, as the temporary report, and transmits the prepared temporary report to the management server 10. The management server 10 which receives the temporary report, updates the usage ratio of the fixing roller in accordance with the temporary report, and registers the updated usage ratio in the usage history 30.

In the example of FIG. 6, the temporary report is requested by estimating the timing at which the usage ratio reaches the threshold value (80%). On the other hand, according to the temporary report transmitted from the image forming apparatus 40, the usage ratio of the fixing roller is actually 84% when the temporary report is received. This difference is caused by changing the usage situation of the fixing roller in the image forming apparatus 40 at an optional timing, such as between the regular reports. In case of the example shown in FIG. 6, the increase ratio of the usage ratio ($\Delta P1/\Delta T1$), which is used for calculating the timing B1, is the inclination between the timing A1 and the timing A2 (the graph shown by a dashed line in the drawing). On the other hand, the actual increase ratio of the usage ratio is increased after the timing Q1 between the regular report C1 and the regular report C2 because the thickness of the paper sheet used in the image forming apparatus 40 is changed from the thickness 1 to the thickness 3 at the timing Q1.

In consideration of the above difference, the management server 10 determines the timing of transmitting the request of the next temporary report (the timing of obtaining the next temporary report). For example, the management server 10 calculates the recent increase ratio of the usage ratio from the usage ratio which is 70% when the regular report C2 is received, the usage ratio which is 84% when the temporary report B1 is received, and the time $\Delta T2$ from the regular report C2 to the temporary report B1. Further, in accordance with the recent increase ratio, the management server 10 calculates the timing at which the usage ratio reaches the next threshold value, for example, 90%, and determines the calculated timing as the timing of transmitting the request of the next temporary report.

Each threshold value of the usage ratio, which is used for determining the timing at which the next temporary report is received, is previously set to 80%, 90%, 95% and 98%. The threshold value which is larger than the current usage ratio and which is the closest to the current usage ratio is selected as the next threshold value among the threshold values. The interval of the threshold values may be small as the usage ratio approaches 100%. Alternatively, instead of the use of the threshold value, the value $\Delta P2$ may be directly set from the current usage ratio. That is, the function of the value $\Delta P2$ for the current usage ratio (the function in which as the usage ratio approaches 100%, the value $\Delta P2$ gradually decreases) is set. Then, the value $\Delta P2$ at the current usage ratio is obtained by referring to this function and the value $\Delta T2$ may be calculated by substituting the obtained value $\Delta P2$ in Equation 1.

Next, an example of the calculation of the usage amount of the fixing lump will be explained.

In this example, the usage amount of the fixing lump is calculated in accordance with the number of printed paper sheets. The fixing lump is lit for the preheat before the print job is executed. After the print job is executed, the fixing lump is lit for a while (for example, the fixing lump is lit while the light quantity is lowered for a certain degree) in consideration of the case in which the next job is entered in a short time since the execution of the previous print job. Therefore, in case of the job for printing an image on only one paper sheet, the lighting time of the fixing lump becomes long with respect to the number of the printed sheets. In case of the job for printing images on many paper sheets, the lighting time of the fixing lump is substantially proportional to the number of the printed sheets. Therefore, as shown in FIG. 7, in case of the job for printing an image on only one paper sheet, the number of printed sheets is multiplied by the coefficient of 3. In case of the job for printing images on two or more paper sheets, the number of printed sheets is multiplied by the coefficient of 1. As a result, the error caused when the lighting time (the usage amount) of the fixing lump is calculated from the number of the printed sheets is reduced.

Also, in case of the fixing lump, by the method which is substantially the same as that for the case of the fixing roller, the timing of transmitting the request of the temporary report is calculated. That is, every when the regular report is received, the management server 10 calculates the increase in the usage amount of the fixing lump in accordance with the usage amount (the number of the printed paper sheets) and the usage condition (the number of the job for printing an image on only one paper sheet, and the like), and updates the usage ratio of the fixing lump. Then, in case that the updated usage ratio of the fixing lump exceeds the threshold value, the management server 10 specifies the fixing lump as the part to be reported in the temporary report, and calculates the timing of transmitting the request of the temporary report to the image forming apparatus 40 having the specified fixing lump, by the operation like the above-described Equation 1.

When the timing has come, the management server 10 transmits the request of the temporary report to the image forming apparatus 40 having the specified fixing lump. When the image forming apparatus 40 receives the request of the temporary report, the image forming apparatus 40 prepares the temporary report relating to the fixing lump and transmits the prepared temporary report to the management server 10. The management server 10 which receives the temporary report, updates the usage history 30 relating to the fixing lump. Then, the management server 10 calculates the timing of transmitting the request of the next temporary report to the image forming apparatus 40.

Next, the case in which the management server 10 receives the replacement request for the specified replacement part from the image forming apparatus 40 before the calculated timing of transmitting the request of the temporary report relating to the specified replacement part to the image forming apparatus 40, will be explained. In this case, the management server 10 cancels the scheduled transmission of the request of the temporary report.

Figure 8:
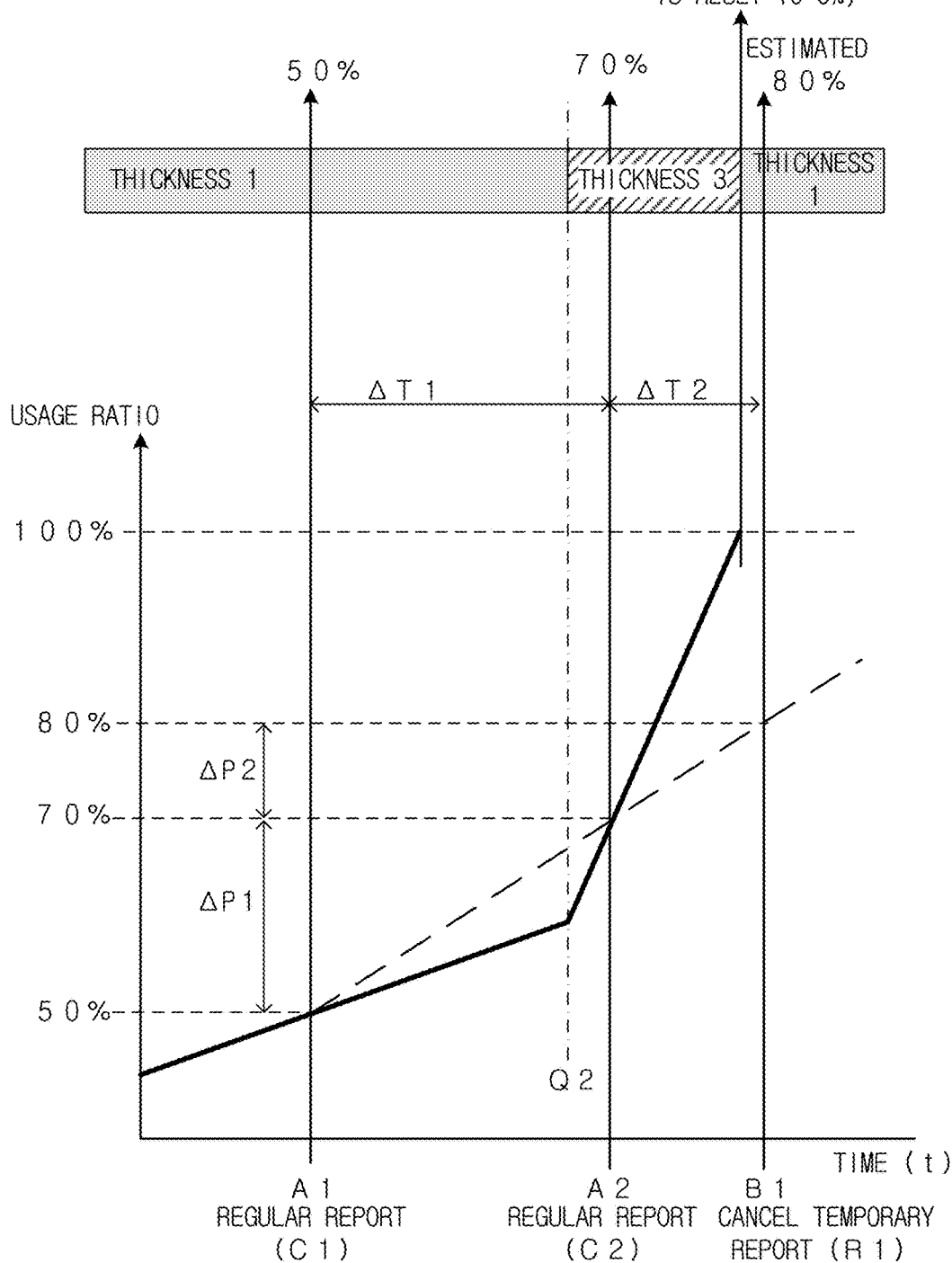
FIG. 8 is a view showing an example of the case in which the replacement request for the part is received before the scheduled timing of the request of the temporary report.

In the example of FIG. 8, like the case shown in FIG. 6, the timing (the timing B1) at which the usage ratio reaches 80% is estimated. When the timing B1 has come, the request of the temporary report relating to the specified fixing roller will be transmitted to the image forming apparatus 40 having the specified fixing roller. However, before the timing B1, the management server 10 receives the replacement request for the fixing roller (in general, the replacement request due to the end of the lifetime) from the image forming apparatus 40. In the example of FIG. 8, because the used paper sheet is changed to the paper sheet having the thickness 3 at the timing Q2 shortly before the timing A2, the increase ratio of the usage ratio is drastically increased. As a result, the lifetime of the fixing roller is exhausted before the estimated timing at which the usage ratio reaches 80%.

When the management server 10 receives the replacement request for the fixing roller and the fixing roller is replaced, the management server 10 resets the usage ratio of the fixing roller to 0. Further, the management server 10 cancels the transmission of the request of the temporary report, which is scheduled so as to carry out the transmission of the request at the timing B1. Thereby, the unnecessary temporary report is prevented.

Next, the case in which the calculated timing of transmitting the request of the temporary report is the same as or is later than the timing of receiving the next regular report, will be explained.

In this case, it is not necessary to receive the temporary report immediately after the next regular report. Moreover, when the next regular report is received, the management server 10 may calculate the timing of transmitting the request of the temporary report again. Therefore, in case that the timing of transmitting the request of the temporary report is the same as or is later than the timing of receiving the next regular report, the transmission of the request of the temporary report is cancelled.

Figure 9:
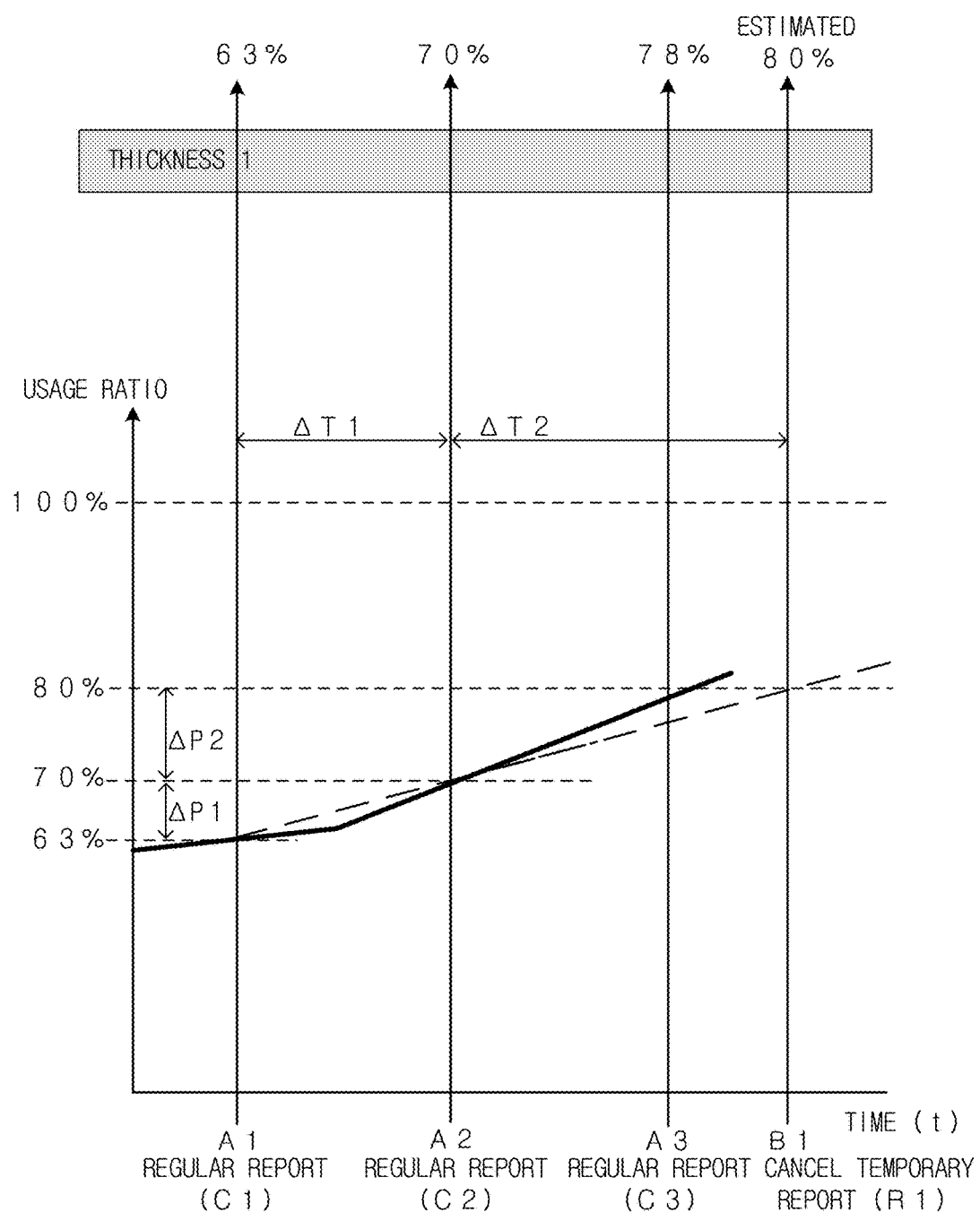
FIG. 9 is a view showing an example of the case in which the timing of obtaining the temporary report is later than the timing of receiving the next regular report.

FIG. 9 shows the above example. Because ΔT2 which is calculated when the regular report C2 is received, is not less than ΔT1 (the timing B1 at which the request of the temporary report will be transmitted is the same as or is later than the timing A3 at which the next regular report C3 will be received), the request of the temporary report is not transmitted at the timing calculated when the regular report C2 is received.

Next, an example in which in the next regular report, the image forming apparatus 40 omits and does not transmit the information relating to the usage amount and the usage condition of the replacement part, which has been transmitted to the management server 10 according to the request of the temporary report, will be explained.

Figure 10:
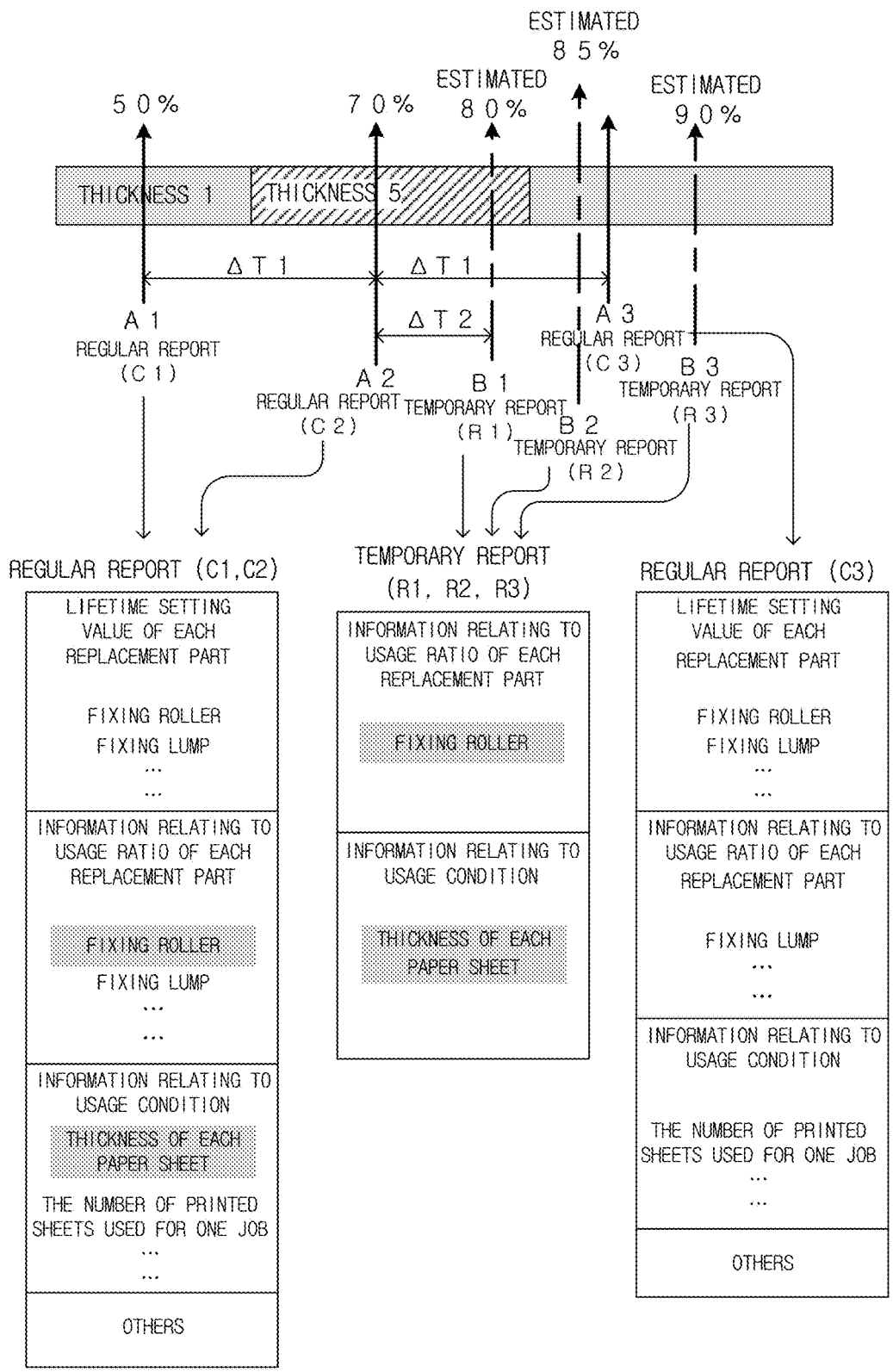
FIG. 10 is a view showing the information relating to the replacement part, which has been transmitted to the management server in the temporary report is not transmitted in the next regular report.

FIG. 10 shows the example in which the information relating to the replacement part, which has been transmitted to the management server 10 in the temporary report is not transmitted in the next regular report. In this example, the regular report C1 is transmitted at the timing A1, the regular report C2 is transmitted at the timing A2, and the regular report C3 is transmitted at the timing A3. Further, at the timing B1 and the timing B2 which are between the timing A2 and the timing A3, the temporary reports R1 and R2 relating to the fixing roller are transmitted, respectively. At the timing B3 which is later than the timing A3, the temporary report R3 is transmitted.

In this case, in both of the regular reports C1 and C2, the information relating to the usage amount and the usage condition of the fixing roller is included. On the other hand, in the regular report C3 which is transmitted after the temporary reports R1 and R2 are transmitted, the information relating to the usage amount and the usage condition of the fixing roller (deterioration/exhaustion information) is not included and is omitted. Thereby, the size of the communication data for the regular report is reduced.

Figure 11A:
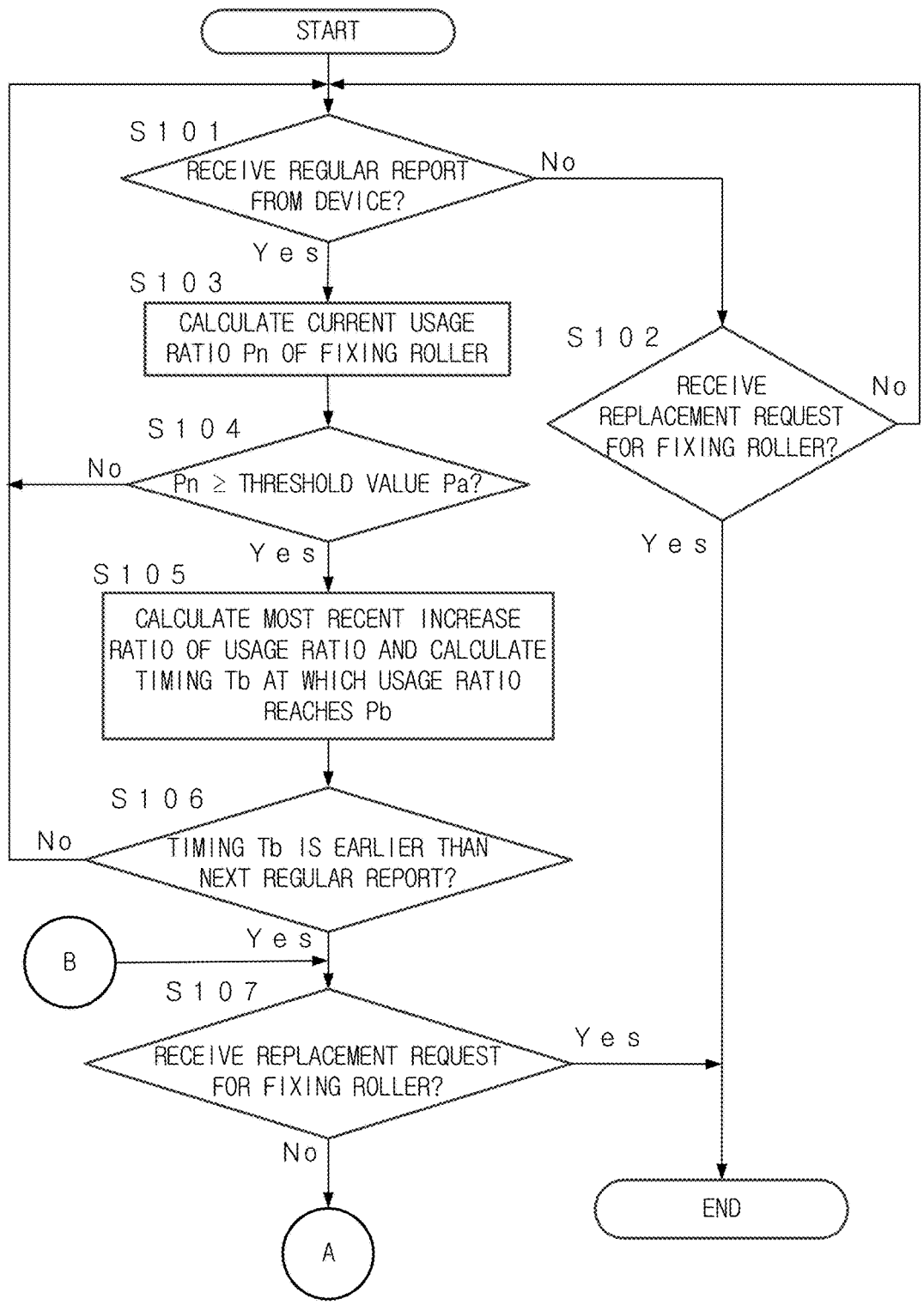
FIGS. 11A and 11B are a flowchart showing the process which is carried out by the management server.
Figure 11B:
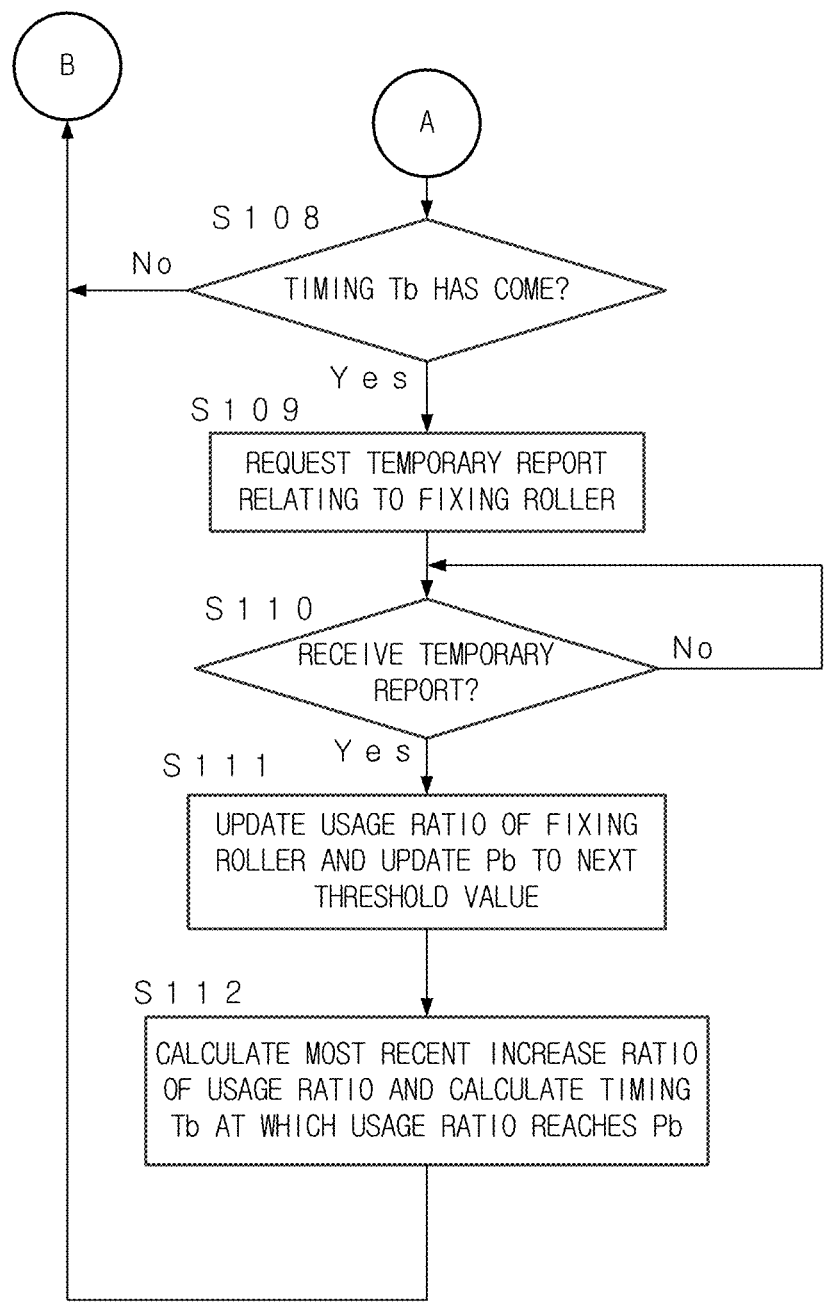

FIGS. 11A and 11B show the process which is carried out by the management server 10. In this case, the replacement part is the fixing roller. The management server 10 checks whether to receive the regular report from the device to be maintained (the image forming apparatus 40 or the like) (Step S101). When the regular report is received (Step S101; Yes), the management server 10 calculates the current usage ratio Pn of the fixing roller (Step S103). In case that the current usage ratio Pn is less than the predetermined threshold value Pa (Step S104; No), the process returns to Step S101 and is continued. The value Pa is the threshold value of the usage ratio at which the temporary report is necessary.

In case that the current usage ratio Pn is the predetermined threshold value Pa or more (Step S104; Yes), the most recent increase ratio of the usage ratio is calculated. Then, the timing Tb at which the usage ratio of the fixing roller reaches Pb is calculated from the calculated increase ratio and the current usage ratio (Step S105). In case that the calculated timing Tb is the same as or is later than the scheduled timing of the next regular report (Step S106; No), the process returns to Step 101.

In case that the calculated timing Tb is earlier than the scheduled timing of the next regular report (Step S106; Yes), the management server 10 monitors whether to receive the replacement request for the fixing roller (Step S107; No) and waits for the timing Tb (Step S108). In case that the management server 10 receives the replacement request for the fixing roller from the image forming apparatus 40 before the timing Tb (Step S107; Yes), the process is ended. In this case, the fixing roller is replaced and the usage ratio is reset to 0.

In case that the timing Tb has come without receiving the replacement request for the fixing roller (Step S107; No and Step S108; Yes), the management server 10 transmits the request of the temporary report relating to the fixing roller to the image forming apparatus 40 having the above fixing roller (Step S109).

The management server 10 waits for the reception of the temporary report from the image forming apparatus 40 (Step S110; No). When the temporary report is received (Step S110; Yes), the management server 10 updates the usage ratio of the fixing roller in accordance with the temporary report. Further, the management server 10 updates the usage ratio Pb which is the threshold value used for requesting the next temporary report relating to the fixing roller (Step S111). For example, when the previous Pb is 80%, the value Pb is updated to 85% or 90%. Then, the most recent increase ratio of the usage ratio of the fixing roller is calculated, and the timing Tb at which the usage ratio of the fixing roller reaches Pb is calculated from the calculated increase ratio and the current usage ratio (Step S112). The process returns to Step S107 and is continued.

In case that the regular report is not received in Step S101 (Step S101; No), the management server 10 checks whether to receive the replacement request for the fixing roller from the image forming apparatus 40 (Step S102). In case that the replacement request is not received (Step S102; No), the process returns to Step S101 and is continued. In case that the replacement request is received (Step S102; Yes), the process is ended.

Figure 12:
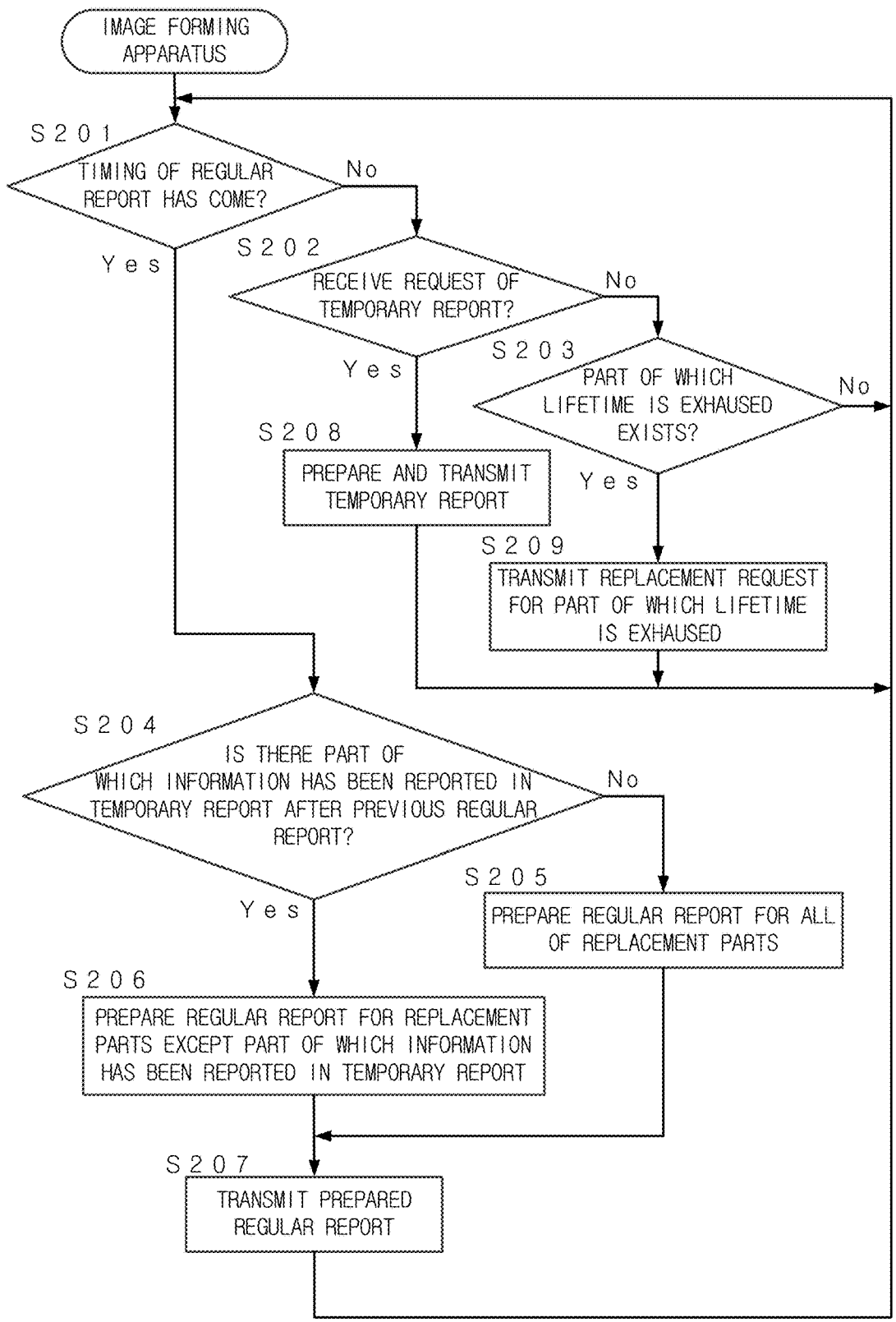
FIG. 12 is a flowchart showing the process for transmitting the regular report and the temporary report, which is carried out by the image forming apparatus.

FIG. 12 shows the process for transmitting the regular report and the temporary report, which is carried out by the image forming apparatus 40. The image forming apparatus 40 manages the timing of the regular report. When the timing of the regular report has come (Step S201; Yes), the image forming apparatus 40 checks whether the replacement part of which the information has been reported in the temporary report after the previous regular report exists or not (Step S204). In case that the above replacement part does not exist (Step S204; No), the image forming apparatus 40 prepares the regular report indicating the information relating to each usage amount and the like (the deterioration/exhaustion information) of all of the replacement parts (Step S205). Then, the process proceeds to Step S207.

In case that the replacement part of which the information has been reported in the temporary report after the previous regular report exists (Step S204; Yes), the image forming apparatus 40 prepares the regular report indicating the information relating to each usage amount and the like (the deterioration/exhaustion information) of the replacement parts except the replacement part of which the information has been reported in the temporary report (Step S206). Then, the process proceeds to Step S207. The information of the replacement part, which has been reported in the temporary report is excluded from the regular report.

In Step S207, the image forming apparatus 40 transmits the prepared regular report to the management server 10. Then, the process returns to Step S201 and is continued.

In case that the timing of the regular report has not come (Step S201; No), the image forming apparatus 40 checks whether to receive the request of the temporary report from the management server 10 (Step S202). In case that the request of the temporary report is received from the management server 10 (Step S202; Yes), the image forming apparatus 40 prepares the temporary report according to the received request and transmits the prepared temporary report to the management server 10 (Step S208). Then, the process returns to Step S201.

In case that the request of the temporary report is not received (Step S202; No), the image forming apparatus 40 checks whether the replacement part of which the lifetime is exhausted (the replacement timing has come) exists in the replacement parts of the image forming apparatus 40 (Step S203). In case that the replacement part of which the lifetime is exhausted exists (Step S203; Yes), the image forming apparatus 40 transmits the replacement request for the replacement part of which the lifetime is exhausted to the management server 10 (Step S209). Then, the process returns to Step S201. On the other hand, in case that the replacement part of which the lifetime is exhausted does not exist (Step S203; No), the process returns to Step S201 and is continued.

According to the above-described embodiment, it is possible to suppress the communication load for the image forming apparatus 40 and the management server 10 and to precisely estimate the timing at which the lifetime of the replacement part is exhausted. Further, because the management server 10 judges the timing of transmitting the request of the temporary report, it is possible to take various measures, for example, to set the usage ratio Pb which is the threshold value for judging whether to request the temporary report, and the like, in consideration of the situation of each device (the lifetime, the environment and the like) and further the information relating to another device connected with the management server 10. Further, because the management server 10 manages the image forming apparatuses 40 and the like, an administrator or the like can easily change the usage ratio Pb which is the threshold value at an optional timing without changing the program for the image forming apparatus 40 and the like.

Further, because the management server 10 manages a plurality of image forming apparatuses 40, in case that one image forming apparatus 40 is used like another image forming apparatus 40, the threshold value which is set to another image forming apparatus 40 can be set to one image forming apparatus 40. For example, if there are many cases in which the usage ratio reaches 85% when the request of the temporary report is transmitted at the timing at which the usage ratio becomes 80%, it is possible to reduce the threshold value to 78% or the like. That is, it is possible to correct the threshold value by learning the experience obtained from a plurality of image forming apparatuses 40, and the like.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In this embodiment, the image forming apparatus 40 is explained as the device to be maintained. The device to be maintained is not limited to the image forming apparatus 40. The device may be one which comprises a plurality of replacement parts.

In this embodiment, the timing of requesting the next temporary report is calculated by using the average of the inclinations of the graph indicating the usage ratio between the regular report which is received at this time and the regular report which was received at the previous time, as the increase ratio of the usage ratio. However, the recent increase in the usage ratio is compared with the previous increase in the usage ratio, and in case that the recent increase in the usage ratio is larger than the previous increase in the usage ratio, the increase ratio of the usage ratio may be set by correcting the recent increase to a larger value and by calculating the average of the inclinations based on the corrected recent increase.

The present invention may include the program for causing an information processing device to function as the electronic apparatus setting device or the non-transitory recording medium storing the above program.

In case that the usage amount is calculated (the normalized value is calculated) by the image forming apparatus 40 in consideration of the usage condition, the deterioration/exhaustion information to be reported in the regular report and the temporary report may include only the information relating to the usage amount. The information relating to the usage condition may be omitted. The deterioration/exhaustion information may be the information used for the estimation of the replacement timing of the replacement part. For example, the usage ratio of the part, both of the usage amount and the usage condition, the normalized usage ratio, the usage ratio to the lifetime of the part, or the like may be included in the deterioration/exhaustion information.

In this embodiment, the maintenance management server uses the regular report indicating the deterioration/exhaustion information for a plurality of replacement parts (for example, all of the replacement parts in the device to be maintained) and the temporary report indicating the deterioration/exhaustion information for the specified replacement part as necessary. The deterioration/exhaustion information may be the information used for the estimation of the replacement timing of the replacement part. For example, the usage ratio of the part, both of the usage amount and the usage condition, the normalized usage ratio, the usage ratio to the lifetime of the part, or the like may be included in the deterioration/exhaustion information.

In this embodiment, even in the case of the same usage amount, the deterioration of the part is different according to the usage condition. By using the usage condition, it is possible to precisely estimate the timing at which the lifetime of the replacement part is exhausted.

In this embodiment, the deterioration/exhaustion information for the part having the usage ratio which exceeds the threshold value is reported in the temporary report. Further, the increase ratio of the usage ratio is calculated and the timing at which the usage ratio reaches the threshold value is estimated. When the estimated timing has come, the device to be maintained, which has the above part is requested to transmit the temporary report.

In this embodiment, the timing of requesting the temporary report is estimated by assuming that the usage ratio is increased at the increase ratio which is the same as the recent increase ratio.

In this embodiment, in case that the replacement request for the replacement part is received before the temporary report is requested, the replacement part is replaced and the usage ratio is reset to 0. As a result, the request of the temporary report is cancelled.

In this embodiment, in order to suppress the communication load by avoiding the overlapped transmission of the deterioration/exhaustion information, the deterioration/exhaustion information for the replacement part for which the deterioration/exhaustion information has been reported in the temporary report, is not included in the next report.

According to the maintenance management device, the device to be maintained and the non-transitory recording medium storing a computer readable program, it is possible to suppress the increase in the communication load and suitably manage the replacement timing of each part.

Although embodiments of the present invention have been described and illustrated in detail, the disclosed embodiments are made for purpose of illustration and example only and not limitation. The scope of the present invention should be interpreted by terms of the appended claims.

What is claimed is:

1. A maintenance management device, comprising:
   a communicator that communicates with a device to be maintained through a network; and
   a hardware processor that:
      regularly receives a regular report indicating deterioration/exhaustion information for a plurality of replacement parts, from the device to be maintained via the network;
      determines whether the deterioration/exhaustion information for a specified replacement part of the plurality of replacement parts is required before a next regular report is received and determines a specified timing of obtaining the deterioration/exhaustion information for the specified replacement part, in accordance with the deterioration/exhaustion information in the received regular report; and
      requests, via the network, a temporary report indicating the deterioration/exhaustion information for the specified replacement part, to the device to be maintained at the specified timing, and obtains the temporary report.

2. The maintenance management device of claim 1, wherein the deterioration/exhaustion information is information indicating a usage amount and a usage condition of the replacement part.

3. The maintenance management device of claim 1, wherein
   the hardware processor:
      calculates a usage ratio of each replacement part to a lifetime setting value;
      specifies the replacement part for which the deterioration/exhaustion information is required before the next regular report is received, in accordance with the calculated usage ratio;
      calculates a timing at which the usage ratio reaches a predetermined threshold value by calculating an increase ratio of the usage ratio from the deterioration/exhaustion information for the specified replacement part, which has been received a plurality of times; and
      specifies the calculated timing as the timing of obtaining the deterioration/exhaustion information.

4. The maintenance management device of claim 3, wherein the increase ratio of the usage ratio is calculated in accordance with a difference between the usage ratio calculated most recently and the usage ratio calculated when a previous regular report is received, and an interval of the regular reports.

5. The maintenance management device of claim 1, wherein the hardware processor does not transmit a request of the temporary report to the device to be maintained in case that the hardware processor receives a replacement request for the specified replacement part from the device to be maintained before the specified timing of obtaining the deterioration/exhaustion information for the specified replacement part.

6. A device to be maintained by the maintenance management server of claim 1, comprising:
   a communicator that communicates with the maintenance management server through a network;
   a hardware processor that:
      regularly transmits the regular report to the maintenance management server via the network; and
      prepares the temporary report and transmits the temporary report to the maintenance management server via the network when a request of the temporary report is received from the maintenance management server,
   wherein in case that the hardware processor transmits the temporary report after a previous regular report is transmitted, the hardware processor does not include the deterioration/exhaustion information for the replacement part, which has been reported in the transmitted temporary report, in the next regular report.

7. A non-transitory recording medium storing a computer readable program which is executed by an information processing device,
wherein the program causes the information processing device to perform:
regularly receiving a regular report indicating deterioration/exhaustion information for a plurality of replacement parts, from a device to be maintained connected to the information processing device via a network;
determining whether the deterioration/exhaustion information for a specified replacement part of the plurality of replacement parts is required before a next regular report is received and determining a specified timing of obtaining the deterioration/exhaustion information for the specified replacement part, in accordance with the deterioration/exhaustion information in the received regular report; and
requesting a temporary report indicating the deterioration/exhaustion information for the specified replacement part, to the device to be maintained at the specified timing via a network, and obtaining the temporary report.

8. The non-transitory recording medium of claim 7, wherein the deterioration/exhaustion information is information indicating a usage amount and a usage condition of the replacement part.

9. The non-transitory recording medium of claim 7, wherein in the specifying,
a usage ratio of each replacement part to a lifetime setting value is calculated;
the replacement part for which the deterioration/exhaustion information is required before the next regular report is received, is specified in accordance with the calculated usage ratio;
a timing at which the usage ratio reaches a predetermined threshold value is calculated by calculating an increase ratio of the usage ratio from the deterioration/exhaustion information for the specified replacement part, which has been received a plurality of times; and
the calculated timing is specified as the timing of obtaining the deterioration/exhaustion information.

10. The non-transitory recording medium of claim 9, wherein in the specifying, the increase ratio of the usage ratio is calculated in accordance with a difference between the usage ratio calculated most recently and the usage ratio calculated when a previous regular report is received, and an interval of the regular reports.

11. The non-transitory recording medium of claim 7, wherein in the requesting, a request of the temporary report is not transmitted in case that a replacement request for the specified replacement part is received from the device to be maintained before the specified timing of obtaining the deterioration/exhaustion information for the specified replacement part.

12. The maintenance management device of claim 1, wherein the specified timing is obtained by interpolating a time that a usage ratio reaches a threshold value using a usage rate of the previous regular report.

* * * * *